(12) United States Patent  
Colman (10) Patent No.: US 9,218,556 B2  
(45) Date of Patent: Dec. 22, 2015

(54) PLUGS HAVING DEPOLARIZERS

(71) Applicant: ORIDION MEDICAL 1987 LTD., Jerusalem (IL)

(72) Inventor: Joshua Lewis Colman, Jerusalem (IL)

(73) Assignee: Oridion Medical 1987 Ltd., Jerusalem (IL)

( * ) Notice: Subject to any disclaimer, the term of this patent is extended or adjusted under 35 U.S.C. 154(b) by 87 days.

(21) Appl. No.: 14/182,225

(22) Filed: Feb. 17, 2014

(65) Prior Publication Data

US 2015/0235119 A1    Aug. 20, 2015

(51) Int. Cl.
G06K 7/10 (2006.01)
G06K 19/06 (2006.01)
G06K 7/14 (2006.01)

(52) U.S. Cl.
CPC ........ *G06K 19/06046* (2013.01); *G06K 7/1404* (2013.01); *Y10T 29/4998* (2015.01)

(58) Field of Classification Search
CPC .................. G06K 7/12; G06K 7/14

USPC .................................. 235/454, 455
See application file for complete search history.

(56) References Cited

U.S. PATENT DOCUMENTS

| 4,269,685 | A | * | 5/1981 | Parker | 204/414 |
| 5,366,496 | A | * | 11/1994 | Dahl et al. | 607/132 |
| 5,557,210 | A | * | 9/1996 | Cappa et al. | 324/539 |
| 6,437,316 | B1 | | 8/2002 | Colman | |
| 8,763,892 | B2 | | 7/2014 | Colman | |
| 2006/0121590 | A1 | * | 6/2006 | Speerli | 435/173.1 |

* cited by examiner

*Primary Examiner* — Daniel St. Cyr
(74) *Attorney, Agent, or Firm* — Rodney J. Fuller; Booth Udall Fuller, PLC (57) ABSTRACT

The present disclosure provides plugs of cables or tubes including at least one depolarizer, configured to emit depolarized light in response to polarized light impinging thereon and arranged such light emitted from the at least one depolarizer and passed through a polarizing element optically orthogonal to the impinging polarized light can be detected by a connection system.

11 Claims, 6 Drawing Sheets

PLUGS HAVING DEPOLARIZERS

TECHNICAL FIELD

The present disclosure relates generally to the field of plugs for connecting a tube or a cable to a medical instrument.

BACKGROUND

Medical instruments often need to be temporarily connected to peripheral devices and components in the course of operation. An example may be a sampling tube connected to an analyzing instrument such as a capnograph. Another example may an ultrasound probe connected to a sonographic imaging instrument. Such peripheral devices may need to be replaced frequently due to one or more reasons. For example, a disposable probe may be used for each treated patient, and should be replaced after use by a new probe for a next patient. Another reason for frequently connecting and disconnecting probes from an instrument may be related to multi-purpose instruments. Such instruments are configured to carry our one of several routines, for obtaining one of several optional purposes. Generally, a particular routine and purpose may be associated with a specific peripheral device that needs to be connected to the instrument for carrying out the routine. For example a user of a sonographic imaging system may wish to carry out one type of examination using one type of ultrasound probe, and then to carry out a second type of examination using a second type of ultrasound probe. Thus, frequent replacement of probes is required, typically being carried out by disconnecting a previously used probe and connecting a new probe to the instrument, instead.

SUMMARY

Aspects of the disclosure, in some embodiments thereof, relate to plugs for connecting a tube or a cable to a medical instrument.

Adequate connection of a peripheral device, such as a probe, to a medical instrument is often of crucial importance. Improper connection might cause physical or other direct injury to a patient; might cause inadequate or invalid sampling or measurement or analysis, leading to false medical diagnosis and treatment; and might cause damage to the medical instrumentation itself. Likewise, ensuring the connection of a specific type of a peripheral device that is suitable for a desired operation is important, to avoid confusion that might lead misconnection and use of a wrong peripheral device.

The plugs of the present disclosure may include at least one depolarizer configured to emit depolarized light in response to polarized light impinging thereon and arranged such that a connection system can detect at least one parameter of the light emitted.

According to certain aspects of the disclosure, the at least one depolarizer and the detection of the at least one parameter of the light emitted therefrom may be utilized to ensure that a medical device is activated only when a correct plug is properly connected. This may prevent operation of a medical device when no constituent is connected or even when a correct constituent is improperly connected, thereby reducing damage to sensitive parts of the instrument as well as incorrect readings.

According to other aspects of the disclosure, the plugs of the present disclosure may facilitate identification of the plug (and hence the constituent attached thereto) as belonging to a certain type, which again may be utilized to automatically actuate the medical instrument in an operation mode suitable to the identified plug.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

According to some embodiments, there is provided a plug of a cable or a tube having at least one depolarizer, configured to emit depolarized light in response to polarized light impinged upon the at least one depolarizer. The at least one depolarizer is arranged such that a connection system can detect at least one parameter of the light emitted from the at least one depolarizer and passed through a polarizing element, the polarizing element optically orthogonal to the impinging polarized light.

According to some embodiments, the plug includes at least two depolarizers. According to some embodiments, the at least two depolarizers may differ in at least one of light intensity, wavelength, time delay of emission and decay time.

According to some embodiments, the depolarizer is located on an end face of said plug. According to some embodiments, the depolarizer is located on an outer wall of the plug. According to some embodiments, the at least one depolarizer is attached to, embedded in or molded on the plug.

According to some embodiments, the at least one parameter of the emitted light may include: presence of light, light intensity, wavelength, time delay of emission, decay time or combinations thereof. According to some embodiments, the at least one parameter is indicative of the type of the plug. According to some embodiments, the at least one parameter is indicative of a preferred mode of operation of the plug (and the constituent attached thereto).

According to some embodiments, the connection system may be configured to identify changes in the at least one parameter during the insertion and/or revolving of the plug relative to a socket.

According to some embodiments, the plug is configured to connect to a medical device. According to some embodiments, when the at least one parameter is identified, the medical device is actuated. According to some embodiments, when the at least one parameter is identified, the medical device is actuated in a preferred mode of operation.

According to some embodiments, there is provided a method including: forming a plug having at least one depolarizer. According to some embodiments, the at least one depolarizer is arranged such that a connection system can detect light emitted therefrom after having been passed through a polarizing element optically orthogonal to the polarized light impinged on the at least one depolarizer.

According to some embodiments, forming the plug includes attaching to, embedding in or molding the depolarizer on the plug.

According to some embodiments, the at least one depolarizer is formed on an outer wall of the plug. According to some embodiments, the at least one depolarizer is formed on an end face of the plug.

According to some embodiments, there is provided a method of verifying a connection of a plug to a socket, the method comprising: inserting a plug having at least one depolarizer into a socket; transmitting polarized light of a first polarization toward the at least one depolarizer; providing a polarizing element optically orthogonal to the polarized light transmitted on the at least one depolarizer; and detecting, using a light detector, at least one parameter of light emitted from the at least one depolarizer and passed through the polarizing element.

According to some embodiments, the at least one parameter may be presence of light, light intensity, wavelength, time delay of emission, decay time or combinations thereof.

According to some embodiments, the method further includes actuating a medical device, when the at least one parameter is detected.

BRIEF DESCRIPTION OF THE DRAWINGS

Some embodiments of the disclosure are described herein with reference to the accompanying figures. The description, together with the figures, makes apparent to a person having ordinary skill in the art how some embodiments of the disclosure may be practiced. The figures are for the purpose of illustrative discussion and no attempt is made to show structural details of an embodiment in more detail than is necessary for a fundamental understanding of the teachings of the disclosure. For the sake of clarity, some objects depicted in the figures are not to scale.

DETAILED DESCRIPTION

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

The present disclosure relates generally to the field of plugs for connecting a tube or a cable to a medical instrument.

According to some embodiments, there is provided a plug of a cable or a tube comprising at least one depolarizer, configured to emit depolarized light in response to light, such as polarized light, impinging thereon.

According to some embodiments, the term "polarized light" as used herein may refer to light having polarization along a preferred direction, such as, but not limited to linear polarization.

According to some embodiments, the term "plug" as used herein may refer to a connector such as a tube connector configured to connect between a tube, such as for example a sampling tube and a medical device (for example a gas analyzer). Alternatively or additionally, the plug can also be used for connecting any other constituent such as, but not limited to, cannulas, pulse oximeter probes, Electrocardiography (ECG) or Electroencephalography (EEG) electrodes, non-invasive blood pressure (NIBP) Cuffs and the like, to a medical device. The plug may be radial, such as a luer connector, for instance a female and/or male luer connector. However other plugs, such as non-radial push-in connectors also fall under the scope of the disclosure.

According to some embodiments, the terms "peripheral device" and "constituent" as used herein may interchangeably refer to tubes, cannulas, pulse oximeter probes, Electrocardiography (ECG) or Electroencephalography (EEG) electrodes, non-invasive blood pressure (NIBP) Cuffs and any other suitable element configured to be connected to a medical device.

According to some embodiments, as used herein, the term "depolarizer" may refer to an optical element or a material configured to emit depolarized light in response to polarized light impinging thereon. According to some embodiments, the depolarizer may include a phosphorescent material, which will emit and return depolarized light in response to polarized light falling thereupon. According to some embodiments, the depolarizer may include a fluorescent material which will emit and return depolarized light in response to polarized light falling thereupon. According to some embodiments, the depolarizer may include: Cornu depolarizers, Lyot depolarizers, Wedge depolarizers or combinations thereof. Each possibility is a separate embodiment. According to some embodiments, the term "depolarized light" as used herein means light having polarization without a preferred direction.

According to some embodiment, the depolarizer may be replaced by a repolarizing element, such as for example a crystalline material, configured to shift the polarization direction of light impinging thereon to a direction orthogonal thereto. It is understood that such repolarizing elements fall within the scope of the present disclosure.

According to some embodiments, "phosphorescent material", as used herein, may include materials that emit light in a wavelength or wavelengths characteristic to the material being exposed to the light irrespectively of the wavelength of the impinging light, materials that emit light at a time delay after being exposed to light and/or materials having a time decay of emission. According to some embodiments, the phosphorescent material is configured to emit light having a different spectral content than the light to which the material is exposed. Typically, light emitted by a phosphorescent material in response to impinging light is at a spectral range associated with longer wavelength compared to a wavelength of the impinging light. However, according to some embodiments, impinging light may also result in light emitted from a phosphorescent material at equal wavelengths or at shorter wavelengths than those of the impinging light.

As used herein the term "time delay" may refer to the amount of time passing between impingement of light on the depolarizer and emission of light from the depolarizer. According to some embodiments, the time delay may be in the range of 0.5-100 milliseconds, in the range of 100-1000 milliseconds, or in the range of 1-30 seconds. Each possibility is a separate embodiment.

According to some embodiments, different phosphorescent materials may have different decay times. As used herein, the term "decay time" may refer to a time period during which a phosphorescent material emits light, after the impinging light has been turned off. According to some embodiments, the phosphorescent materials may have extremely short decay times, e.g. shorter than 1 micro-second. According to some embodiments, the phosphorescent materials may have decay times between 1 micro-second and 1 millisecond. According to some embodiments, the phosphorescent materials may have decay times between 1 millisecond and 1 second. According to some embodiments, the phosphorescent materials may have decay times between 1 second and 30 seconds.

According to some embodiments, the phosphorescent material may include but are not limited to: oxidic phosphors, sulfidic phosphors, phosphate phosphors, aluminate phosphors, borate phosphors, vanadate phosphors, gallate phosphors, arsenate phosphors, germanate phosphors, stannate phosphors, silicate phosphors, fluoride phosphors, oxofluoride phosphors, or combinations thereof. Each possibility is a separate embodiment. In particular, the phosphors can include, but are not limited to: $Y_3Al_5Oi_2$:Ce; $(Y,Gd)_3(Al,Ga)_5Oi_2$:Ce; $BaMgAli_0O_{17}$:Eu; $Mn,Y_2O_2SrEu$; $Bi,YVO_4$:Eu; $YBO_3$:(Ce,Tb); $(Sr,Ba)_2SiO_4$:Eu; $Ca_2MgSi_2O_7$:Eu; $Sr_2CeO_4$:Eu; SrS:Eu; $SrGa_2S_4$:Eu; $(Sr,Ca,Ba)(Al,Ga)_2S_4$:Eu; $SrY_2S_4$:Eu; (Ca,Sr)S:Eu; (Mg,Ca)S:Eu; SrS:Ce, CaS:Ce, $CaLa_2S_4)$Ce; or CaS:(Ce,Eu), in which the elements noted after the ":" sign are present in the form of dopants. As used herein the term "dopant" may refer to activators of the phosphorescent material configured to activate and/or prolong the emission time (afterglow) of the material. It should be noted that the charge has not been included on portions of the formulae above ($Eu^{2+\ or\ 3+}$, $Mn^{2+\ or\ 4+}$, $Ce^{3+}$, and $Tb^{3+}$), but one skilled in the art can determine the appropriate charge. Also, it should be noted that the positive charge of these ions is balanced by $O^{2"}$ (oxide) and/or $S2"$ (sulfide), as appropriate, leading to electrically neutral compositions. For simplicity, hydrated forms of the above compositions are not listed, as it will be apparent to those of skill in the art that such hydrates would operate in the same way as the anhydrous compounds. In other instances in the present disclosure, charges have been included.

The phosphorescent material may have an emission spectrum within a particular color range or range of wavelengths. Hence, the phosphorescent material may emit light having different colors, such as but not limited to blue, green, red, yellow and orange. Each possibility is a separate embodiment. For example, if the phosphorescent material emits primarily in the blue range, the phosphor may be called a blue phosphor. Approximate color ranges in the visual spectrum are as follows: violet or deep blue (about 390-455 nm), blue (about 455-492 nm), green (about 492-577 nm), yellow (about 577-597 nm), orange (about 597-622 nm), red (about 622-770 nm), infrared (IR) (about 770-5000 nm).

As used herein, the term "at least one depolarizer" may refer to 1, 2, 3, 4, 5, or more depolarizers. Each possibility is a separate embodiment. According to one, non-limiting example, the plug comprises at least two depolarizers. According to some embodiments, the at least two depolarizers are identical. According to some embodiments, the at least two depolarizers are different, such that at least one of the parameters of the emitted light differs between the depolarizers. For example, the polarizers may emit light having different wavelength. Additionally or alternatively, the depolarizers may emit light at different time delays of emission. Additionally or alternatively, the depolarizers may have different time decay of emission. Additionally or alternatively, the depolarizers may emit light having different intensities.

According to some embodiments, the at least one depolarizer is arranged such that a connection system can detect at least one parameter of the light emitted from the at least one depolarizer and passed through a polarizing element optically orthogonal to the polarized light impinged on the depolarizer. Additionally or alternatively, the at least one depolarizer is arranged such that a connection system can identify changes in the at least one parameter during the insertion and/or revolving of the plug relative to a socket. It is understood by one of ordinary skill in the art that when polarized light impinges on the depolarizer, the emitted light is essentially randomly polarized. In effect, part of the light being emitted by the depolarizer is of a polarization which can pass a polarizing element having a polarization optically orthogonal to the polarized light impinged on the depolarizer.

As used herein, the term "polarizing element" may refer to an optical element configured to selectively allow therethrough, light having one polarization, and to block, at least partially, light having another polarization, so that depolarized light passing through the polarizer becomes polarized. The polarizations being transmitted and blocked by the polarizing element may be referred to as being "optically orthogonal" to one another. According to some embodiments, the polarizing element is a linear polarizer.

As used herein, the terms "socket" and "receptacle" can be interchangeably used and refer to a device connector configured to receive the plug.

As used herein, the terms "parameter", "characteristic" and "property" with regards to the emitted light may refer to any parameter of the light, which can be detected, measured and/or quantified by any component and/or device known in the art to be suitable for this purpose. According to some embodiments, the at least one parameter may generate a 'fingerprint' that may allow a high-resolution distinction between different plugs and/or different classes of plugs. According to some embodiments, the at least one parameter may include: presence light, light intensity, wavelength, time delay of emission, decay time and combinations thereof. Each possibility is a separate embodiment.

According to some embodiments, the at least one parameter may be indicative of a type of the plug. According to some embodiments, a change in the at least one parameter during insertion of the plug into the socket may be indicative of a type of the plug. According to some embodiments, a change in the at least one parameter during revolving of the plug relative to the socket may be indicative of a type of the plug. As used herein the term "type", "model", "class" of the plug may interchangeably be used and may relate to the interface to be used with the plug. As a non-limiting example, plugs may be identified as belonging to a certain class according to the color of the emitted light.

According to some embodiments, the at least one parameter may be indicative of a preferred mode of operation of the constituent (such as tube, probe, cable etc.) attached thereto. According to some embodiments, a change in the at least one parameter during insertion of the plug into the socket may be indicative of a preferred mode of operation of the constituent attached thereto. According to some embodiments, a change in the at least one parameter during relative revolving of the plug and the socket may be indicative of a preferred mode of operation of the constituent attached thereto.

According to some embodiments, the connector may be configured to connect to a medical device. According to some embodiments, the medical device is a capnograph.

According to some embodiments, when the at least one parameter and/or the change therein is identified, the medical device may be actuated. According to some embodiments, when said at least one parameter and/or the change therein is identified, the medical device may be actuated in a preferred mode of operation. According to some embodiments, when the at least one parameter and/or the change therein is identified, the medical device may be deactivated.

According to some embodiments, the at least one depolarizer is located on an end face of the plug. According to some embodiments, the at least one depolarizer may cover or be an integral part of the end face of the plug. Alternatively, the at least one depolarizer may cover or be an integral part of the entire end face of the plug. According to some embodiments, the at least one depolarizer is located on an outer wall of the plug. According to some embodiments, the at least one depolarizer may cover, or be an integral part of the outer wall of the plug. According to some embodiments, the at least one depolarizer may cover, or be an integral part of the entire outer wall of the plug.

According to some embodiments, the plug may include a transparent window, overlapping at least partially with the depolarizer, thereby facilitating the depolarizer to emit light on one side of the plug in response to light impinging on an another side of the plug.

According to some embodiments, the at least one depolarizer is attached to, embedded in or molded on the plug. As a non-limiting example, the, phosphorescent material (for instance, in the form of a powder) may be added to a mold, thereby becoming a part of the molded polymer which forms the plug or a part thereof.

According to some embodiments, there is provided a connection system configured to identify at least one parameter of light emitted from at least one depolarizer positioned on (or otherwise attached to) or embedded in a plug. According to some embodiments, the connection system may be configured to identify changes in the at least one parameter during insertion of the plug into a socket. Additionally or alternatively, the connection system may be configured to identify recurring changes in the at least one parameter during the revolving of the plug relative to the socket.

According to some embodiments, the system includes at least one light source and a first polarizing element associated therewith, configured to transmit polarized light, having a first polarization. Alternatively, the system includes a first light source, such as but not limited to a laser, configured to emit polarized light having a first polarization.

According to some embodiment, the system may also include at least one light detector, such as but not limited to an RGB detector, configured to detect light emitted from at least one depolarizer of a plug and optionally to distinguish between different colors of the detected light.

According to some embodiment, the system may also include a second polarizing element disposed such that light emitting from the at least one depolarizer of the plug will reach the second polarizing element prior to reaching the light detector. The second polarizing element may be oriented orthogonally to the first polarizing element or to the polarization direction of the impinging light, such that light being of the first polarization will be essentially blocked whereas light of a second, orthogonal polarization will be allowed through. It is understood by one of ordinary skill in the art, that such configuration may ensure that a medical device will be actuated only when a correct plug is properly connected, and that light transmitted from the first light source will not erroneously actuate the medical device.

According to some embodiments, if a correct plug is properly connected to the socket, depolarized light is emitted from the depolarizer in response to the polarized light impinged thereon. The depolarized light then passes through a second polarizer, which is configured to allow therethrough only light having a second polarization, orthogonal to the first polarization. Since the resulting depolarized light includes parts that are of both the first and second polarization, part of the depolarized light passes through the second polarizer and can now be detected by the light detector. The light detector may then generate an output signal indicating a connection between the plug and the socket.

On the other hand, if a plug is improperly connected to the socket, or if an improper plug is connected to the socket, no light will reach the light detector and no signal, a zero output signal or an output signal otherwise indicating lack of connection, may result. For example, if the plug does not include a depolarizer (such as a phosphorescence material), but is made of, or includes, a reflective material, light having the first polarization will impinge on the plug and be reflected thereby. The reflected light, having a first polarization, will be blocked by the second polarizing element, and consequently no light will be detected by the light detector. In other cases, for example if the plug does not include a depolarizer and is not made of or otherwise include a reflective material, light having the first polarization will impinge on the plug, but will not be reflected. Consequently no light is detected by the light detector.

According to some embodiment, the connection system may be configured to identify the presence of a plug based on the identification of the least one parameter of the light emitted from the depolarizer. According to some embodiment, the connection system may be configured to identify the presence of a connector based on the identification of a change in the least one parameter during insertion of the plug into a socket or during revolving of the plug relative to the socket.

According to some embodiments, the connection system may be further configured to identify the plug as belonging to a certain class based on the at least one parameter and/or changes therein. As a non-limiting example, the connection system may identify the plug as belonging to a certain class based on the color of the light emitted from the plug. Optionally, the connection system may be further configured to distinguish between different classes of plugs. As a non-limiting example, the connection system may be configured to identify a plug attached to a sampling tube adapted for use with infants and to distinguish between this plug and a plug attached to a sampling tube adapted for use in adults.

According to the some embodiment, the connection system may be configured to generate at least one signal based on the at least one identified parameter. According to some embodiments, the at least one signal generated may serve as a trigger to activate a medical device. Alternatively or additionally, the at least one signal may serve to influence an operation mode of the medical device.

According to some embodiments, there is further provided, a method for identifying a plug, the method comprising inserting a plug having at least one depolarizer into a socket; transmitting polarized light of a first polarization toward the at least one depolarizer; providing a polarizing element optically orthogonal to the polarized light impinged on the depolarizer and; using a light detector, detecting at least one parameter of light emitted from the at least one depolarizer and passed through the polarizing element.

According to some embodiments, the at least one parameter may include: presence of light, light intensity, wavelength, time delay of emission, decay time and combinations thereof.

According to some embodiments, the method comprises identifying a change in the at least one parameter during the insertion of the plug into the socket. According to some embodiments, the method further comprises identifying a change in the at least one parameter during the revolving of the plug relative to the socket.

According to some embodiments, the method further comprises producing at least one signal based on the at least one parameter. According to some embodiments, the at least one signal generated may serve as a trigger to activate a medical device. Alternatively or additionally, the at least one signal may serve to influence an operation mode of the medical device.

According to some embodiments, there is further provided a method which includes forming a plug having at least one depolarizer, arranged such that a connection system can detect light emitted from the at least one depolarizer and passed through a polarizing element optically orthogonal to the polarized light impinged upon the depolarizer.

According to some embodiments, forming comprises attaching to, molding on and embedding the depolarizer in the plug. According to some embodiments, forming comprises adding the depolarizer, such as but not limited to a phosphorescent material in the form of a powder, during molding, such that it becomes an integral part of the polymer which forms the plug or a part thereof.

According to some embodiments, the at least one depolarizer is formed on an outer wall of the plug. Alternatively or additionally the at least one depolarizer is formed on an end face of the plug.

The principles, uses and implementations of the teachings herein may be better understood with reference to the accompanying description and figures. Upon perusal of the description and figures present herein, one skilled in the art is able to implement the teachings without undue effort or experimentation.

Before explaining at least one embodiment in detail, it is to be understood that aspects of the embodiments are not necessarily limited in their application to the details of construction and the arrangement of the components and/or methods set forth herein. Some embodiments may be practiced or carried out in various ways. The phraseology and terminology employed herein are for descriptive purpose and should not be regarded as limiting.

Figure 1:
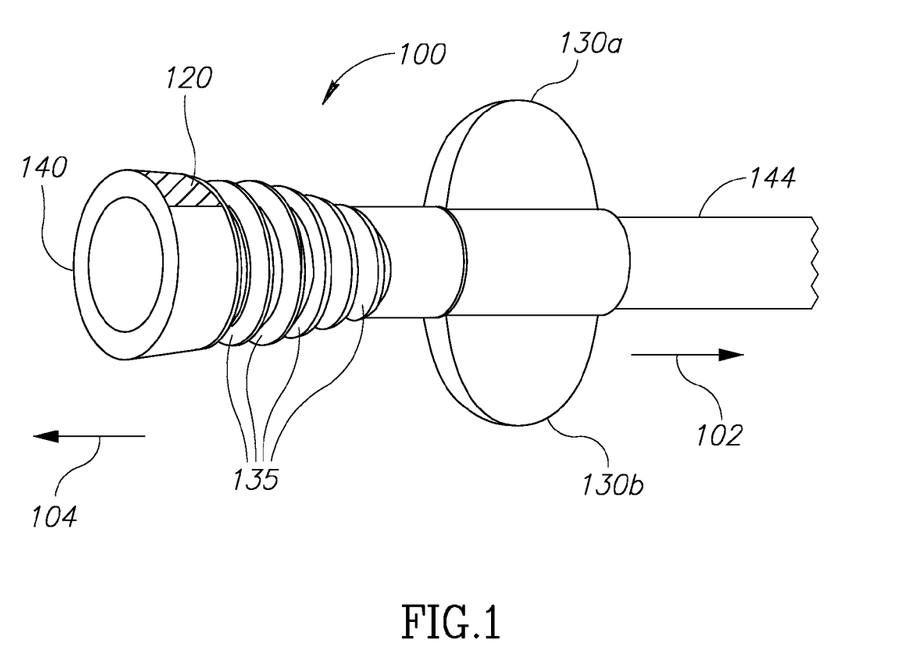
FIG. 1 schematically illustrates a perspective view of an exemplary plug, according to some embodiments.

Reference is now made to FIG. 1, which schematically illustrates a perspective view of an exemplary plug, according to some embodiments.

The plug, here exemplified as plug 100, may include two ends: a constituent end 102, which is the end that may be connected to a tube or any other suitable constituent; and a device end 104, which is the end that may be used to connect the plug to a device/instrument. Plug 100 has an elongated cylindrical-like shape; however other suitable shapes are also applicable. Plug 100 has a depolarizer 120, on an outer wall 144 thereof. However, it is understood by one of ordinary skill in the art that other configurations, such as those described in FIG. 2 below, fall under the scope of the disclosure. Plug 100 is exemplified as having one depolarizer, however as understood from embodiments herein, different numbers of depolarizers are also applicable, such as two or more depolarizers.

Constituent end 102 of plug 100 includes gripping wings 130a-b (such gripping wings may have any shape or form and may also be absent from the connector). Device end 104 of plug 100 has an end face 140 having a circular, annular shape. Spiral threads, such as threads 135, may optionally be found at the outer surface of the connector in close proximity to device end 104 of plug 100 and may be used to secure plug 100 to its matching socket (not shown).

According to some embodiments, plug 100 may be radial, such as for instance a luer connector (as illustrated in FIG. 1). However other plugs, such as non-radial push-in plugs also fall under the scope of the disclosure.

Reference is now made to FIG. 2 which schematically illustrates perspective views of plugs comprising one or more depolarizers according to some embodiments. It is understood by one of ordinary skill in the art that the illustrated plugs are non-limiting examples and that additional configurations, not illustrated in the exemplary figures, fall under the scope of the disclosure.

Figure 2A:
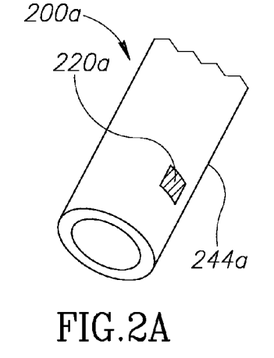
FIG. 2A schematically illustrates a perspective view of a plug having one depolarizer in an outer wall thereof, according to some embodiments.

FIG. 2A schematically illustrates a perspective view of a plug 200a including a depolarizer 220a disposed on or embedded in a part of an outer wall 244a of plug 200a. It is understood by one of ordinary skill in the art that revolving plug 200a relative to a socket (such as socket 312/412) of a connection system (such as connection system 310/410) configured to transmit light toward plug 200a, may result in recurrent emission of light by depolarizer 220a in that depolarizer 220a will emit light only when transmitted light reaches depolarizer 220a, at a predetermined time delay after transmitted light reaches depolarizer 220a and/or at a predetermined length of time after transmitted light has been turned off (decay time). It is further understood that the emitted light may be of a certain intensity and/or wavelength characteristic to depolarizer 220a.

Figure 2B:
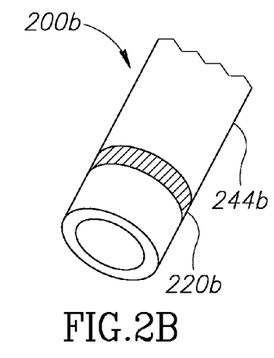
FIG. 2B schematically illustrates a perspective view of a plug having one depolarizer in an outer wall thereof, according to some embodiments.

FIG. 2B schematically illustrates a perspective view of a plug 200b including a depolarizer 220b disposed circumferentially in an outer wall 244b of plug 200b. It is understood by one of ordinary skill in the art that revolving plug 200b relative to a socket (such as socket 312/412) of a connection system (such as connection system 310/410) configured to transmit light toward plug 200b, may result in emission of light by depolarizer 220b independently of the revolving of plug 200b relative to the socket. It is further understood that the emitted light may appear at a predetermined time delay after insertion of plug 200b into the socket and/or at a predetermined length of time after transmitted light has been turned off (decay time). The emitted light may be of a certain intensity and/or wavelength characteristic to depolarizer 220b.

Figure 2C:
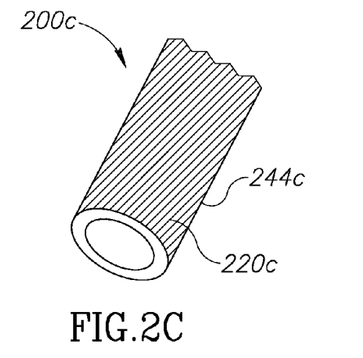
FIG. 2C schematically illustrates a perspective view of a plug having a depolarizer in an outer wall thereof, according to some embodiments.

FIG. 2C schematically illustrates a perspective view of a plug 200c including a depolarizer 220c covering or being an integral part of an entire outer wall 244c of plug 200c. It is understood by one of ordinary skill in the art that revolving plug 200c relative to a socket (such as socket 312/412) of a connection system (such as connection system 310/410) configured to transmit light toward plug 200c, may result in emission of light by depolarizer 220c independently of the revolving of plug 200c relative to the socket. It is further understood that the emitted light may appear at a predetermined time delay after insertion of plug 200c into the socket and/or at a predetermined length of time after transmitted light has been turned off (decay time). The emitted light may be of a certain intensity and/or wavelength characteristic to depolarizer 220c.

Figure 2D:
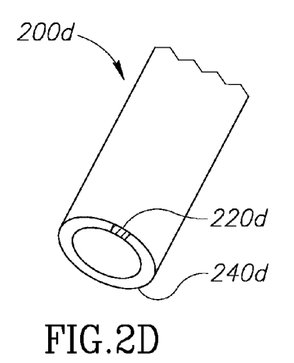
FIG. 2D schematically illustrates a perspective view of a plug having one depolarizer on an end face thereof, according to some embodiments.

FIG. 2D schematically illustrates a perspective view of a plug 200d including a depolarizer 220d positioned on or otherwise included in part of an end face 240d of plug 200d. It is understood by one of ordinary skill in the art that revolving plug 200d relative to a socket (such as socket 312/412) of a connection system (such as connection system 310/410) configured to transmit light toward plug 200d, may result in recurrent emission of light by depolarizer 220d in that depolarizer 220d will emit light only when transmitted light reaches depolarizer 220d, at a predetermined time delay after transmitted light reaches depolarizer 220d and/or at a predetermined length of time after transmitted light has been turned off (decay time). It is further understood that the emitted light may be of a certain intensity and/or wavelength and have a decay time characteristic to depolarizer 220d.

Figure 2E:
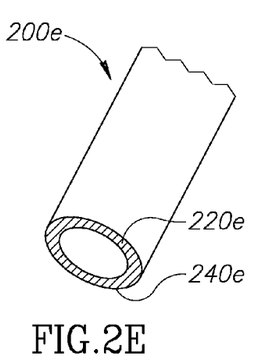
FIG. 2E schematically illustrates a perspective view of a plug having one depolarizer on an end face thereof, according to some embodiments.

FIG. 2E schematically illustrates a perspective view of a plug 200e including a depolarizer 220e covering or otherwise incorporated in an entire end face 240e of plug 200e. It is understood by one of ordinary skill in the art that revolving plug 200e relative to a socket (such as socket 312/412) of a connection system (such as connection system 310/410) configured to transmit light toward plug 200e, may result in emission of light by depolarizer 220e independently of the revolving of plug 200e relative to the socket. It is further understood that the emitted light may appear at a predetermined time delay after insertion of plug 200e into the socket and/or at a predetermined length of time after transmitted light has been turned off (decay time). The emitted light may be of a certain intensity and/or wavelength characteristic to depolarizer 220e.

Figure 2F:
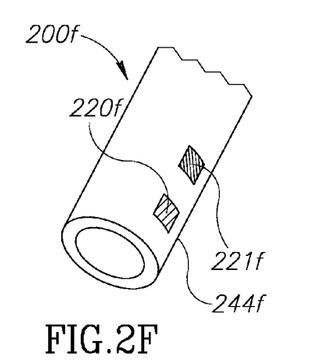
FIG. 2F schematically illustrates a perspective view of a plug having two depolarizers in an outer wall thereof, according to some embodiments.

FIG. 2F schematically illustrates a perspective view of a plug 200f including two depolarizer 220f and 221f disposed on or otherwise included in similar circumferential positions, but different longitudinal positions of outer wall 244f of plug 200f. It is understood by one of ordinary skill in the art that inserting and/or revolving plug 200f relative to a socket (such as socket 312/412) of a connection system (such as connection system 310/410) configured to transmit light toward plug 200f, may result in recurrent emission of light by each of depolarizers 220f and 221f in that depolarizers 220f and 221f will emit light only when transmitted light reaches depolarizers 220f and 221f, at a predetermined time delay after transmitted light reaches depolarizers 220f and 221f and/or at a predetermined length of time after transmitted light has been turned off (decay time), such that emission of light by depolarizers 220f and 221f may be simultaneous or sequential depending on the characteristics (for example time delay of emission) of each of depolarizers 220f and 221f. It is further understood that the emitted light of depolarizers 220f and 221f may be of a same or different intensity and/or wavelength, characteristic to each of depolarizers 220f and 221f.

Figures 2G, 2H:
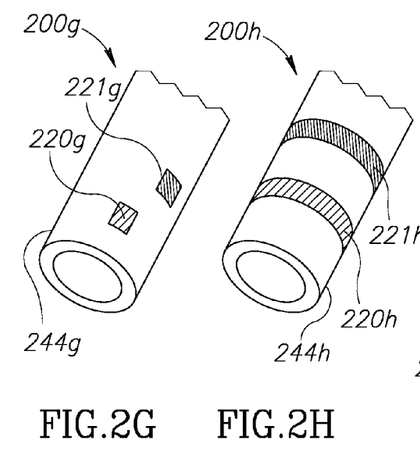
FIG. 2G schematically illustrates a perspective view of a plug having two depolarizers in an outer wall thereof, according to some embodiments.
FIG. 2H schematically illustrates a perspective view of a plug having two depolarizers in an outer wall thereof, according to some embodiments.

FIG. 2G schematically illustrates a perspective view of a plug 200g including two depolarizer 220g and 221g disposed on or otherwise embedded in different circumferential and longitudinal positions of outer wall 244g of plug 200g. It is understood by one of ordinary skill in the art that inserting and/or revolving plug 200g relative to a socket (such as socket 312/412) of a connection system (such as connection system 310/410) configured to transmit light toward plug 200g, may result in recurrent emission of light by each of depolarizers 220g and 221g in that depolarizers 220g and 221g will emit light only when transmitted light reaches depolarizers 220g and 221g, at a predetermined time delay after transmitted light reaches depolarizers 220g and 221g and/or at a predetermined length of time after transmitted light has been turned off (decay time), such that emission of light by depolarizers 220g and 221g may be simultaneous or sequential depending on the characteristics (for example time delay of emission) of each of depolarizers 220g and 221g. It is further understood that the light emitted by depolarizers 220g and 221g may be of a same or different intensity and/or wavelength, characteristic to each of depolarizers 220g and 221g.

FIG. 2H schematically illustrates a perspective view of a plug 200h including depolarizers 220h and 221h disposed or embedded circumferentially on an outer wall 244h of plug 200h. It is understood by one of ordinary skill in the art that inserting plug 200h into a socket (such as socket 312/412) of a connection system (such as connection system 310/410) configured to transmit light toward plug 200h, may result in recurrent emission of light by each of depolarizers 220h and 221h in that depolarizers 220h and 221h will emit light only when transmitted light reaches depolarizers 220h and 221h, at a predetermined time delay after transmitted light reaches depolarizers 220h and 221h and/or at a predetermined length of time after transmitted light has been turned off (decay time), such that emission of light by depolarizers 220h and 221h may be simultaneous or sequential depending on the characteristics (for example time delay of emission) of each of depolarizers 220h and 221h. It is further understood that the light emitted by depolarizers 220h and 221h may be of a same or different intensity and/or wavelength, characteristic to each of depolarizers 220h and 221h.

On the other hand, revolving plug 200h relative to a socket (such as socket 312/412) of a connection system (such as connection system 310/410) configured to transmit light toward plug 200h may result in emission of light by depolarizers 220h and 221h independently of the revolving of plug 200h relative to the socket. It is further understood that the light emitted by depolarizers 220h and 221h may appear at a same or different predetermined time delay after insertion of plug 200h into the socket and/or at a same or different predetermined length of time after transmitted light has been turned off (decay time), depending on the characteristics (for example time delay of emission) of each of depolarizers 220h and 221h. The emitted light may be of a certain intensity and/or wavelength characteristic to each of depolarizers 220h and 221h.

Figure 2I:
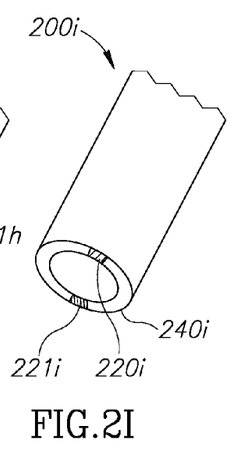
FIG. 2I schematically illustrates a perspective view of a plug having two depolarizers on an end face thereof, according to some embodiments.

FIG. 2I, schematically illustrates a perspective view of a plug 200i including two depolarizer 220i and 221i disposed on or otherwise included in different circumferential positions of part of an end face 240i of plug 200i. It is understood by one of ordinary skill in the art that revolving plug 200i relative to a socket (such as socket 312/412) of a connection system (such as connection system 310/410) configured to transmit light toward plug 200i, may result in recurrent emission of light by each of depolarizers 220i and 221i in that depolarizers 220i and 221i will emit light only when transmitted light reaches depolarizers 220i and 221i, at a predetermined time delay after transmitted light reaches depolarizers 220i and 221i and/or at a predetermined length of time after transmitted light has been turned off (decay time), such that emission of light by depolarizers 220i and 221i may be simultaneous or sequential depending on the characteristics (for example time delay of emission) of each of depolarizers 220$i$ and 221$i$. It is further understood that the light emitted by depolarizers 220$i$ and 221$i$ may be of a same or different intensity and/or wavelength characteristic to each of depolarizers 220$i$ and 221$i$.

Figure 2J:
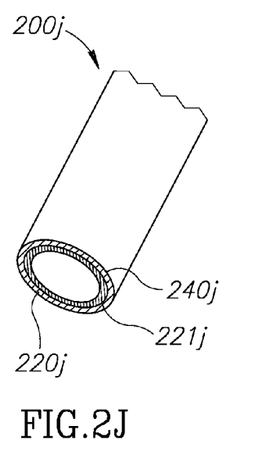
FIG. 2J schematically illustrates a perspective view of a plug having two depolarizers on an end face thereof, according to some embodiments.

FIG. 2J, schematically illustrates a perspective view of a plug 200$j$ including two depolarizer 220$j$ and 221$j$ disposed on or otherwise included in different circumferential positions of an end face 240$j$ of plug 200$j$. It is understood by one of ordinary skill in the art that revolving plug 200$j$ relative to a socket (such as socket 312/412) of a connection system (such as connection system 310/410) configured to transmit light toward plug 200$j$, may result in emission of light by depolarizers 220$j$ and 221$j$ independently of the revolving of plug 200$j$ relative to the socket. It is further understood that the light emitted by depolarizers 220$j$ and 221$j$ may appear at a same or different predetermined time delay after insertion of plug 200$j$ into the socket, and/or at a same or different predetermined length of time after transmitted light has been turned off (decay time), depending on the characteristics (for example time delay of emission) of each of depolarizers 220$j$ and 221$j$. The emitted light may be of a certain intensity and/or wavelength characteristic to each of depolarizers 220$j$ and 221$j$.

Figure 3A:
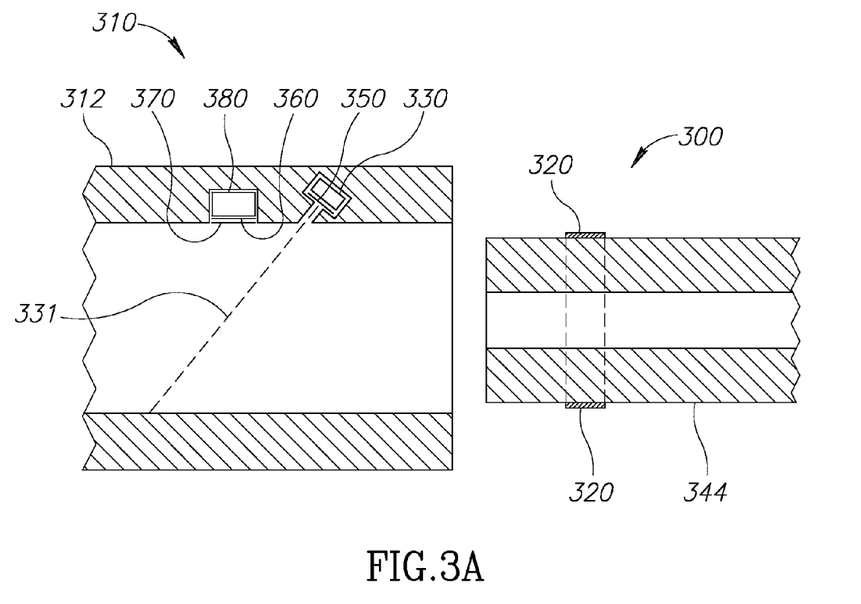
FIG. 3A schematically illustrates a plug and a socket, according to some embodiments.
Figure 3B:
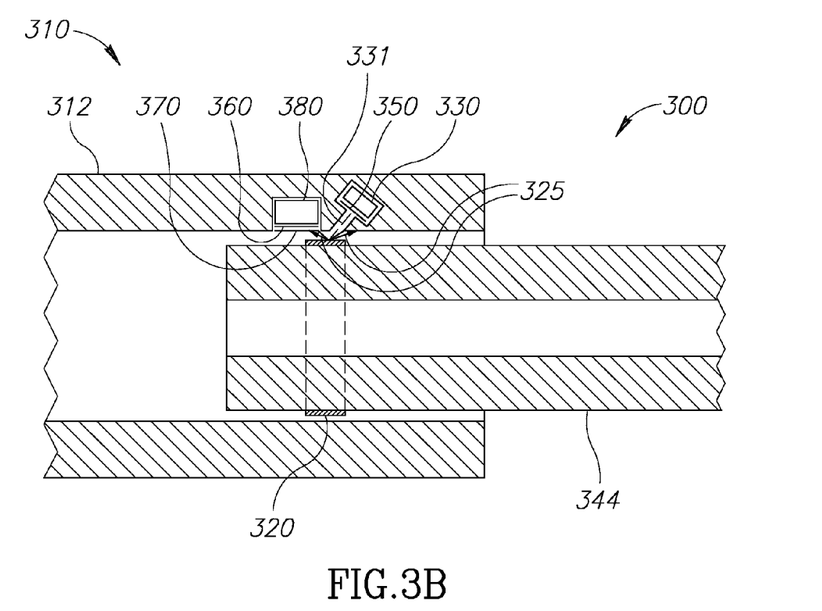
FIG. 3B schematically illustrates a plug inserted into a socket, according to some embodiments.

Reference is now made to FIGS. 3A and 3B which schematically depict a perspective view of a plug 300 having a depolarizer 320 on an outer wall 344 thereof and a block diagram of a connection system 310, according to some embodiments. Depolarizer 320 is depicted as being disposed on or otherwise included in part of outer wall 344 of plug 300, however other configurations, such as, but not limited to those described in FIG. 2 are also applicable. Plug 300 is configured to be attached to or otherwise associated with a peripheral device, such as for example a tube (not shown), and to be connected to a socket 312 of a medical device (not shown).

FIGS. 3A and 3B schematically depict embodiments in which plug 300 is disconnected from socket 312 and in which plug 300 is inserted into socket 312, respectively.

Connection system 310 includes a light source 330. Light source 330 is configured to transmit light 331 towards depolarizer 320 of plug 300 when plug 300 is connected to socket 312, as schematically depicted in FIG. 3B. According to some embodiments, light source 330 may include a Light Emitting Diode (LED), a lamp, a laser diode and any other suitable light source known in the art. According to some embodiments, light source 330 may be configured to transmit light 331 in such way that plug 300 must be located inside socket 312 in order for light to reach depolarizer 320. According to some embodiments, light source 330 may be configured to transmit light 331 at a temporally varying intensity, e.g. in pulses.

According to some embodiments, transmitted light 331 may be polarized light, the polarized light having a first polarization. Alternatively, transmitted light 331 may be depolarized light in which case connection system 310 further includes a first polarizing element 350 disposed such that light transmitted 331 from light source 330 passes first polarizing element 350 prior to reaching depolarizer 320. First polarizing element 350 is configured to allow therethrough light having a first polarization. According to some embodiments, first polarizing element 350 may include a linear polarizer, allowing therethough light having a linear polarization.

Connection system 310 further includes a light detector 380. Light detector 380 is configured to detect light 325 emitted from depolarizer 320 in response to polarized light 331 transmitted from light source 330 impinging on depolarizer 320. According to some embodiments, light detector 380 is an RGB detector configured to detect and optionally distinguish between light of certain colors/wavelengths. Additionally or alternatively, light detector 380 (or optionally a separate detector) may be configured to detect a time delay of emission and/or a decay time of emitted light 325. It is understood by the skilled in the art, that if polarized light 331 transmitted from light source 330 is transmitted in pulses, the light 325 emitted from depolarizer 320, including a phosphorescent material, may be absent of pulses due to a prolonged decay time of the phosphorescent material.

Connection system 310 further includes a second polarizing element 360 disposed such that light 325 emitting from depolarizer 320 will reach second polarizing element 360 prior to reaching light detector 380. Second polarizing element 360 is configured to allow therethrough light having a second polarization. According to some embodiments, second polarizing element 360 may include a linear polarizer, allowing therethough light having a linear polarization orthogonal to the polarization of light impinging on depolarizer 320.

Connection system 310 is configured to identify a proper connection between plug 300 and socket 312. When plug 300 is connected to socket 312, such as depicted in FIG. 3B, polarized light 331 impinges on depolarizer 320. Depolarized light 325, emitted from depolarizer 320, reaches second polarizing element 360 and part of depolarized light 325, having a second polarization, orthogonal to the impinging light, passes through second polarizing element 360 and is then detected by light detector 380, thereby indicating a connection of plug 300 to socket 312. Light detector 380 may then generate an output signal indicating a connection between plug 300 and socket 312.

According to some embodiments, such as when depolarizer 320 includes a phosphorescent material, light 325 emitted from depolarizer 320 may have a different spectral content than light 331 transmitted by light source 330. In some embodiments, light source 330 is configured to transmit light in a first spectral range, such as Ultra-Violet (UV) light, whereas depolarizer 320 is configured to emit light in a different spectral range, such as visible light or Infra-Red (IR) light, in response to light impinging thereon. Typically, light emitted by a phosphorescent material is of a spectral range associated with longer wavelengths compared to the wavelength of the impinging light. However, according to some embodiments, light emitted from the phosphorescent material is of same wavelengths or of shorter wavelengths than that of the impinging light. According to some embodiments, light detector 380 is configured to detect and optionally distinguish between light of certain colors/wavelengths emitted by depolarizer 320.

It is understood by one of ordinary skill in the art that if plug 300 is improperly connected to socket 312, polarized light 331 transmitted by light source 330 and having the first polarization, may not impinge on depolarizer 320 on outer wall 344 and consequently no light is emitted therefrom; and no signal, or a signal indicative of improper/absent connection, is generated. For example, if the plug does not include a depolarizer (such as a phosphorescence material), but is made of, or includes, a reflective material, light having the first polarization will impinge on the plug and be reflected thereby. The reflected light, having a first polarization, will be blocked by the second polarizing element, and consequently no light will be detected by the light detector. In other cases, for example if the plug does not include a depolarizer and is not made of or otherwise include a reflective material, light having the first polarization will impinge on the plug, but will not be reflected. Consequently no light is detected by the light detector.

Optionally, connection system 310 includes a spectral filter 370 configured to block ambient light having one spectral range, and allowing light having another spectral range. According some embodiments, spectral filter 370 is optically disposed between depolarizer 320 and light detector 380. According to some embodiments, spectral filter 370 is configured to block transmitted light 331 having the wavelength of light source 330, and to allow through light 325 having a wavelength typically emitted by depolarizer 320.

Optionally, connection system 310 may include more than one detector (such as 2, 3, or more detectors), each detector configured to detect light of different colors, such that when plug 300 is connected to socket 312, only one of the light detectors detect light 325 emitted by depolarizer 320. According to some embodiments, connection system 310 is then configured to identify plug 300 as belonging to a certain type/class by identifying the detector detecting light 325 emitted by depolarizer 320 of plug 300.

Identification of a proper connection of plug 300 to socket 312 may trigger an output signal configured to provide an indication to a user, e.g. a visual indication, such as a light signal, that plug 300 is adequately connected and optionally actuate the medical device. According to some embodiments, the output signal may indicate the type/class of plug 300 and consequently influence the operation mode of the medical device.

Figure 4A:
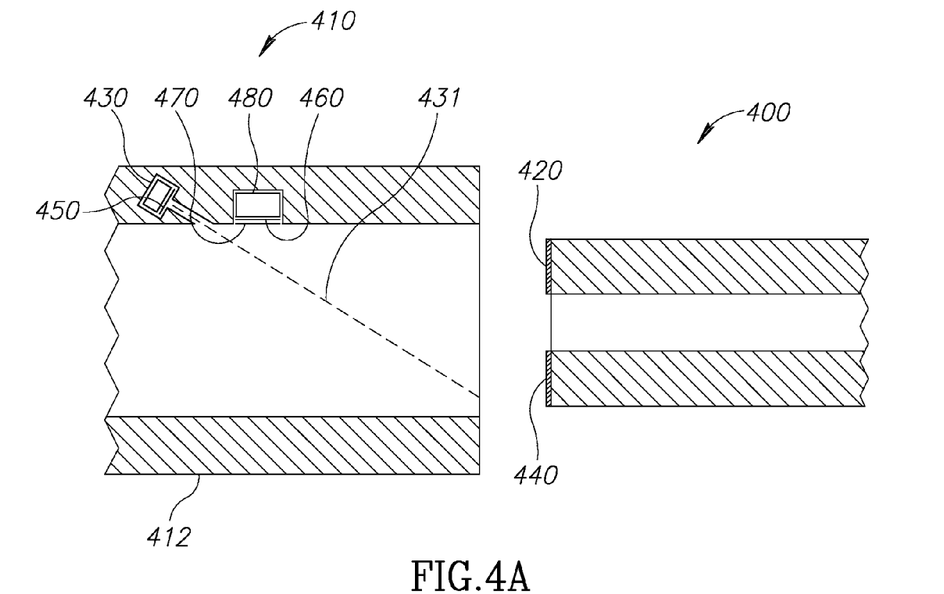
FIG. 4A schematically illustrates a plug and a socket, according to some embodiments.
Figure 4B:
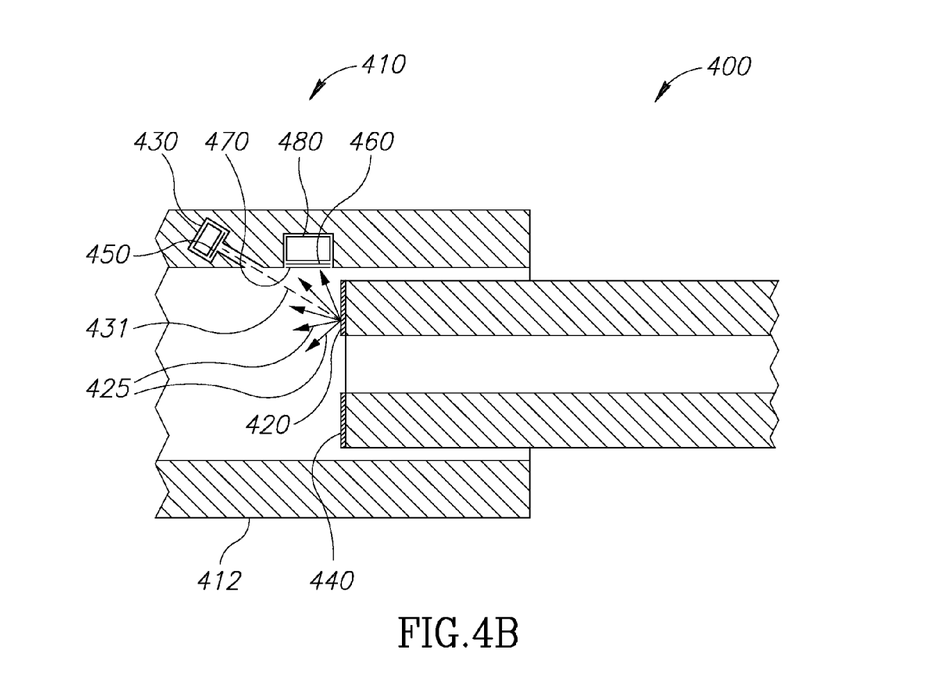
FIG. 4B schematically illustrates a plug inserted into a socket, according to some embodiments.

Reference is now made to FIGS. 4A and 4B which schematically depict a perspective view of a plug 400 having a depolarizer 420 on an end face 440 thereof and a block diagram of a connection system 410, according to some embodiments. Depolarizer 420 is depicted as being disposed on or otherwise included in an entire end face 440; however other configurations, such as those described in FIG. 2 are also applicable.

Plug 400 is associated with a peripheral device, such as for example a tube (not shown), and is configured to be connected to a socket 412 of a medical device (not shown).

FIGS. 4A and 4B schematically depict embodiments in which plug 400 is disconnected from socket 412 and in which plug 400 is inserted into socket 412, respectively.

Connection system 410 includes a light source 430. Light source 430 is configured to transmit light 431 towards depolarizer 420 of plug 400 when plug 400 is connected to socket 412, as schematically depicted in FIG. 4B. According to some embodiments, light source 430 may include a Light Emitting Diode (LED), a lamp, a laser diode and any other suitable light source known in the art. According to some embodiments, light source 430 may be configured to transmit light 431 in such way that plug 400 must be located inside socket 412 in order for transmitted light 431 to reach depolarizer 420. According to some embodiments, light source 430 may be configured to transmit light 431 at a temporally varying intensity, e.g. in pulses.

According to some embodiments, transmitted light 431 may be polarized light, having a first polarization. Alternatively, transmitted light 431 may be depolarized light in which case connection system 410 further includes a first polarizing element 450 disposed such that light 431 transmitted from light source 430 passes first polarizing element 450 prior to reaching depolarizer 420. First polarizing element 450 is configured to allow therethrough light having a first polarization. According to some embodiments, first polarizing element 450 may include a linear polarizer, allowing therethough light having a linear polarization.

Connection system 410 further includes a light detector 480. Light detector 480 is configured to detect light 425 emitted from depolarizer 420 in response to polarized light 431 transmitted from light source 430 impinging on depolarizer 420. According to some embodiments, light detector 480 is an RGB detector configured to detect and optionally distinguish between light of certain colors/wavelengths. Additionally or alternatively, light detector 480 (or optionally a separate detector) may be configured to detect a time delay of emission and/or a decay time of emitted light 425. It is understood by the skilled in the art, that if light 431 transmitted from light source 430 is transmitted in pulses, the light 425 emitted from depolarizer 420, including a phosphorescent material, may be absent of pulses due to a prolonged decay time of the phosphorescent material.

Connection system 410 further includes a second polarizing element 460 disposed such that light 425 emitting from depolarizer 420 will reach second polarizing element 460 prior to reaching light detector 480. Second polarizing element 460 is configured to allow therethrough light having a second polarization. According to some embodiments, second polarizing element 460 may include a linear polarizer, allowing therethough light having a linear polarization orthogonal to the polarization of light 431 impinging on depolarizer 420.

Connection system 410 is configured to identify a proper connection between plug 400 and socket 412. When plug 400 is connected to socket 412, such as depicted in FIG. 4B, polarized light 431 impinges on depolarizer 420. Depolarized light 425, emitted from depolarizer 420, reaches second polarizing element 460 and part of depolarized light 425, having a second polarization, orthogonal to the impinging light, passes through second polarizing element 460 and is then detected by light detector 480, thereby indicating a connection of plug 400 to socket 412. Light detector 480 may then generate an output signal indicating a connection between plug 400 and the socket 412.

According to some embodiments, such as when depolarizer 420 includes a phosphorescent material, light 425 emitted from depolarizer 420 may have a different spectral content than light 431 transmitted by light source 430. In some embodiments, light source 430 is configured to transmit light in a first spectral range, such as Ultra-Violet (UV) light, whereas depolarizer 420 is configured to emit light in a different spectral range, such as visible light or Infra-Red (IR) light, in response to light impinging thereon. Typically, light emitted by a phosphorescent material is of a spectral range associated with longer wavelengths compared to the wavelength of the impinging light. However, according to some embodiments, light emitted from the phosphorescent material is of same wavelengths or of shorter wavelengths than that of the impinging light. According to some embodiments, light detector 480 is configured to detect and optionally distinguish between light of certain colors/wavelengths emitted by depolarizer 420.

It is understood by one of ordinary skill in the art that if plug 400 is improperly connected to socket 412, polarized light 431 transmitted by light source 430 and having the first polarization, may not impinge on depolarizer 420 on end face 440 and consequently no light is emitted therefrom; and no signal, or a signal indicative of improper/absent connection, is generated. For example, if the plug does not include a depolarizer (such as a phosphorescence material), but is made of, or includes, a reflective material, light having the first polarization will impinge on the plug and be reflected thereby. The reflected light, having a first polarization, will be blocked by the second polarizing element, and consequently no light will be detected by the light detector. In other cases, for example if the plug does not include a depolarizer and is not made of or otherwise include a reflective material, light having the first polarization will impinge on the plug, but will not be reflected. Consequently no light is detected by the light detector.

Optionally, connection system 410 includes a spectral filter 470 for blocking ambient light in one spectral range, and allowing light in another spectral range. According some embodiments, spectral filter 470 is optically disposed between depolarizer 420 and light detector 480. According to some embodiments, spectral filter 470 is configured to block light 431 having a wavelength of light source 430, and to allow through light having a wavelength typically emitted by depolarizer 420.

Optionally, connection system 410 may include more than one detector (such as 2, 3, or more detectors), each detector configured to detect light of different colors, such that when plug 400 is connected to socket 412, only one of the light detectors detect light 425 emitted by depolarizer 420. According to some embodiments, connection system 410 is then configured to identify plug 400 as belonging to a certain type/class by identifying the detector detecting the light emitted by depolarizer 420 of plug 400.

Identification of a proper connection of plug 400 to socket 412 may trigger an output signal configured to provide an indication to a user, e.g. a visual indication, such as a light signal, that plug 400 is adequately connected and optionally actuate the medical device. According to some embodiments, the output signal may indicate the type/class of plug 400 and consequently influence the operation mode of the medical device.

Figure 5A:
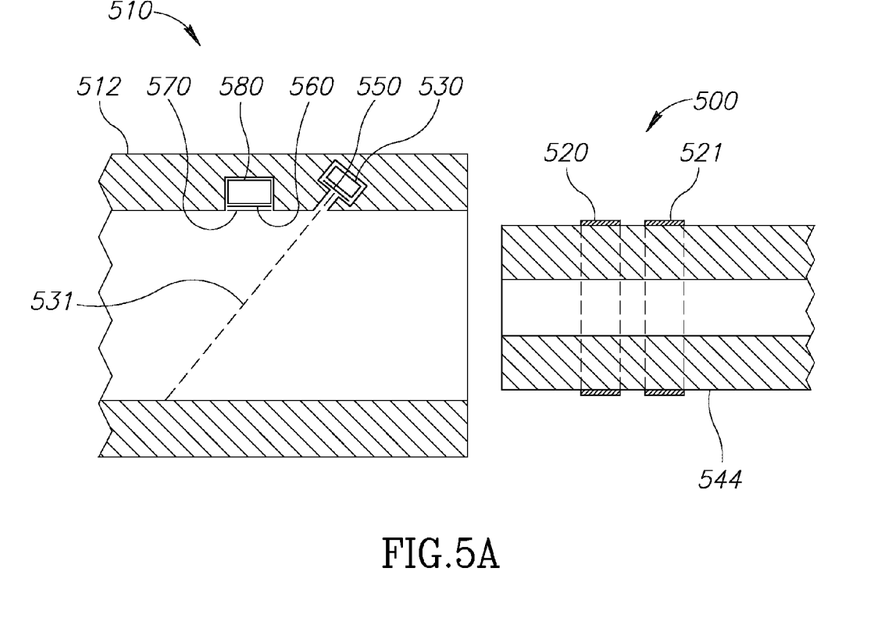
FIG. 5A schematically illustrates a plug and a socket, according to some embodiments.
Figure 5B:
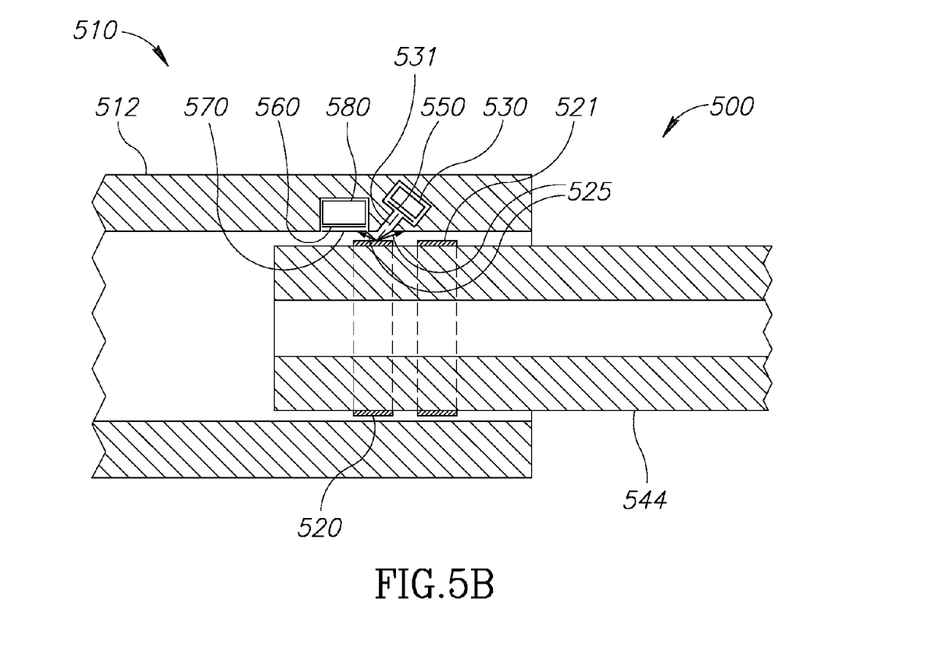
FIG. 5B schematically illustrates a plug inserted into a socket, according to some embodiments.
Figure 5C:
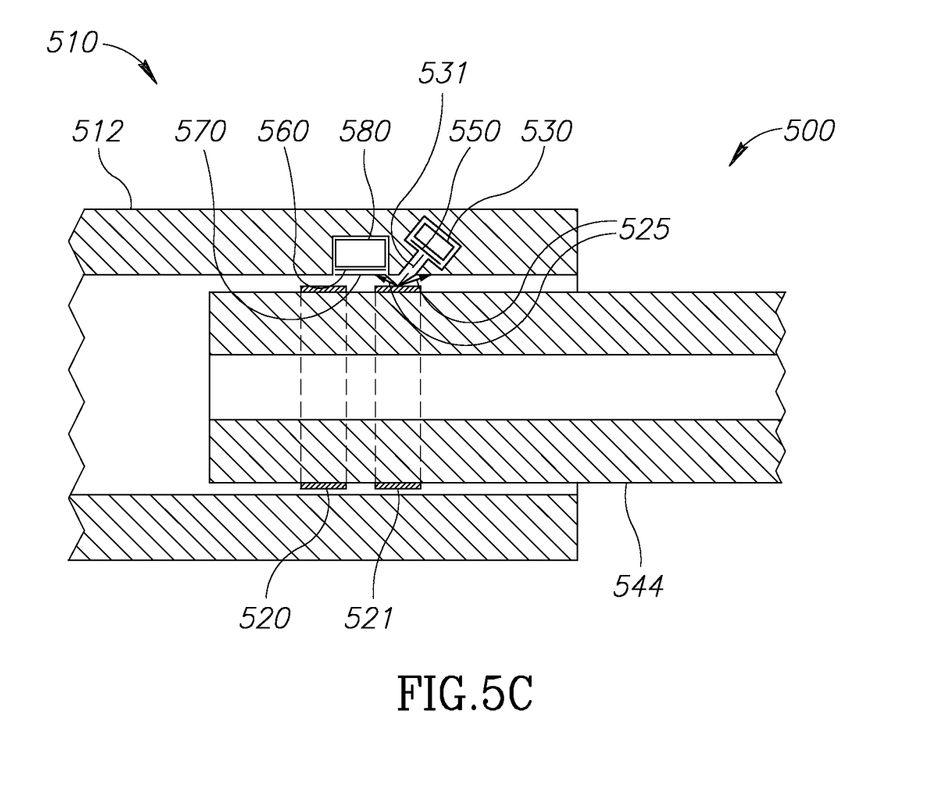
FIG. 5C schematically illustrates a plug inserted into a socket, according to some embodiments.

Reference is now made to FIGS. 5A, 5B and 5C which schematically depict a perspective view of a plug 500 having depolarizers 520 and 521 on an outer wall 544 thereof and a block diagram of a connection system 510, according to some embodiments. Depolarizers 520 and 521 are depicted as being disposed on or otherwise included in part of outer wall 544 of plug 500, however other configurations, such as, but not limited to those described in FIG. 2 are also applicable. Plug 500 is configured to be attached to, or otherwise associated with a peripheral device, such as for example a tube (not shown), and to be connected to a socket 512 of a device (not shown).

FIGS. 5A, 5B and 5C schematically depict embodiments in which plug 500 is disconnected from socket 512 (FIG. 5A) and in which plug 500 is inserted into socket 512 (FIGS. 5B and 5C).

Connection system 510 includes a light source 530. Light source 530 is configured to sequentially transmit light 531 toward depolarizers 520 and 521 of plug 500 when plug 500 is inserted into socket 512, as schematically depicted in FIGS. 5B and 5C. According to some embodiments, light source 530 may include a Light Emitting Diode (LED), a lamp, a laser diode and any other suitable light source known in the art. According to some embodiments, light source 530 may be configured to transmit light 531 in such way that plug 500 must be located inside socket 512 in order for light to reach depolarizer 520. According to some embodiments, light source 530 may be configured to transmit light 531 at a temporally varying intensity, e.g. in pulses.

According to some embodiments, transmitted light 531 may be polarized light, the polarized light having a first polarization. Alternatively, transmitted light 531 may be depolarized light in which case connection system 510 further includes a first polarizing element 550 disposed such that light transmitted 531 from light source 530 passes first polarizing element 550 prior to reaching depolarizers 520 and 521. First polarizing element 550 is configured to allow therethrough light having a first polarization. According to some embodiments, first polarizing element 550 may include a linear polarizer, allowing therethough light having a linear polarization.

Connection system 510 further includes a light detector 580. Light detector 580 is configured to detect light 525 emitted, first from depolarizers 520 (FIG. 5B) and then from depolarizer 521 (FIG. 5C), in response to polarized light 531 transmitted from light source 530 impinging on depolarizer 520 and 521 respectively (as depicted in FIGS. 5B and 5C respectively). According to some embodiments, light detector 580 is an RGB detector configured to detect and optionally distinguish between light of certain colors/wavelengths. Additionally or alternatively, light detector 580 (or optionally a separate detector) may be configured to detect a time delay of emission and/or a decay time of emitted light 525. It is understood by the skilled in the art, that if polarized light 531 transmitted from light source 530 is transmitted in pulses, the light 525 emitted from depolarizers 520 and 521, including phosphorescent materials, may be absent of pulses due to a prolonged decay time of the phosphorescent material.

Connection system 510 further includes a second polarizing element 560 disposed such that light 525 emitted from depolarizers 520 and 521 will reach second polarizing element 560 prior to reaching light detector 580. Second polarizing element 560 is configured to allow therethrough light having a second polarization. According to some embodiments, second polarizing element 560 may include a linear polarizer, allowing therethough light having a linear polarization orthogonal to the polarization of light impinging on depolarizers 520 and 521.

Connection system 510 is configured to identify a proper connection between plug 500 and socket 512. When plug 500 is inserted into socket 512, such as depicted in FIG. 5B, polarized light 531 impinges on depolarizer 520. Depolarized light 525 emitted from depolarizer 520 reaches second polarizing element 560 and part of depolarized light 525, having a second polarization, orthogonal to the impinging light, passes through second polarizing element 560 and is then detected by light detector 580. When plug 500 is further inserted into socket 512, such as depicted in FIG. 5C, polarized light 531 impinges on depolarizer 521. Depolarized light 525, now emitted from depolarizer 521, reaches second polarizing element 560 and consequently part of depolarized light 525, having a second polarization, orthogonal to light impinged on depolarizers 520 and 521, passes through second polarizing element 560 and is then detected by light detector 580. A proper connection can in effect be identified when plug 500 is sufficiently inserted into socket 512 in order for light to be emitted from both depolarizer 520 and depolarizer 521.

According to some embodiments, such as when depolarizers 520 and 521 include a phosphorescent material, light 525 emitted from depolarizers 520 and 521 may have a different spectral content than light 531 transmitted by light source 530. In some embodiments, light source 530 is configured to transmit light in a first spectral range, such as Ultra-Violet (UV) light, whereas depolarizers 520 and 521 are configured to emit light in a different spectral range, such as visible light or Infra-Red (IR) light, in response to light impinging thereon. Typically, light emitted by a phosphorescent material is of a spectral range associated with longer wavelengths compared to the wavelength of the impinging light. However, according to some embodiments, light emitted from the phosphorescent material is of same wavelengths or of shorter wavelengths than that of the impinging light.

According to some embodiments, light detector 580 is configured to detect and optionally distinguish between light of certain colors/wavelengths emitted by each of depolarizer 520 and depolarizer 521.

It is understood that depolarized light 525 emitted from depolarizers 520 and 521 may be identical or different. For example, depolarized light 525 emitted from depolarizer 520 may be of a different wavelength than depolarized light 525 emitted from depolarizer 521. According to some embodiments, light detector 580 is configured to detect and optionally distinguish between light of certain colors/wavelengths emitted by depolarizer 520 and 521 during the insertion of plug 500 into socket 512.

Similarly, the delay in emission of depolarized light 525 by depolarizers 520 and 521 may be identical or different, as described hereinabove. In effect, light 525 emitted from depolarizer 521 may optionally be detected prior to light emitted from depolarizer 520 despite the fact that polarized light 531 transmitted from light source 530 reaches depolarizer 520 prior to reaching depolarizer 521.

It is further understood by one of ordinary skill in the art that if plug 500 is improperly connected to socket 512, polarized light 531 transmitted by light source 530 and having the first polarization, may not impinge on depolarizer 520. Consequently no light is emitted therefrom; and no signal, or a signal indicative of improper/absent connection, is generated. For example, if the plug does not include a depolarizer (such as a phosphorescence material), but is made of, or includes, a reflective material, light having the first polarization will impinge on the plug and be reflected thereby. The reflected light, having a first polarization, will be blocked by the second polarizing element, and consequently no light will be detected by the light detector. In other cases, for example if the plug does not include a depolarizer and is not made of or otherwise include a reflective material, light having the first polarization will impinge on the plug, but will not be reflected. Consequently no light is detected by the light detector.

Optionally, connection system 510 includes a spectral filter 570 configured to block ambient light having one spectral range, and allowing light having another spectral range. According some embodiments, spectral filter 570 is optically disposed between depolarizers 520 and 521 and light detector 580. According to some embodiments, spectral filter 570 is configured to block transmitted light 531 having the wavelength of light source 530, and to allow through light 525 having a wavelength typically emitted by depolarizers 520 and 521.

Optionally, connection system 510 may include more than one detector (such as 2, 3, or more detectors), each detector configured to detect light of different colors, such that when plug 500 is inserted into socket 512, different detectors may detect light 525 emitted by depolarizer 520 and depolarizer 521, respectively. According to some embodiments, connection system 510 is then configured to identify plug 500 as belonging to a certain type/class by identifying changes in the wavelength of light 525 (and/or additional parameters, as essentially described hereinabove), emitted by each of depolarizers 520 and 521.

Identification of a proper connection of plug 500 to socket 512 may trigger an output signal configured to provide an indication to a user, e.g. a visual indication, such as a light signal, that plug 500 is adequately connected and optionally actuate the medical device. According to some embodiments, the output signal may indicate the type/class of plug 500 and consequently influence the operation mode of the medical device.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising", when used in this specification, specify the presence of stated features, integers, steps, operations, elements, or components, but do not preclude or rule out the presence or addition of one or more other features, integers, steps, operations, elements, components, or groups thereof.

While a number of exemplary aspects and embodiments have been discussed above, those of skill in the art will recognize certain modifications, additions and sub-combinations thereof. It is therefore intended that the following appended claims and claims hereafter introduced be interpreted to include all such modifications, additions and sub-combinations as are within their true spirit and scope.

What is claimed is:

1. A plug of a cable or a tube comprising at least one depolarizer, configured to emit depolarized light in response to polarized light impinged upon said at least one depolarizer and arranged such that a connection system can detect at least one parameter of the light emitted from the at least one depolarizer and passed through a polarizing element optically orthogonal to the impinging polarized light; wherein said connection system is further configured to identify changes in said at least one parameter during the insertion and/or revolving of said plug relative to a socket.

2. The plug of claim 1, wherein said at least one parameter comprises: presence of light, light intensity, wavelength, time delay of emission, decay time or combinations thereof.

3. The plug of claim 1, wherein said at least one parameter is indicative of a type of said plug.

4. The plug of claim 1, wherein said at least one parameter is indicative of a preferred mode of operation of said plug.

5. The plug of claim 1, wherein said depolarizer is located on an end face of said plug.

6. The plug of claim 1, wherein said depolarizer is located on an outer wall of said plug.

7. The plug of claim 1, wherein said at least one depolarizer is attached to, embedded in or molded on said plug.

8. The plug of claim 1, wherein said plug is configured to connect to a medical device.

9. The plug of claim 8, wherein when said at least one parameter is identified, said medical device is actuated.

10. The plug of claim 8, wherein when said at least one parameter is identified, said medical device is actuated in a preferred mode of operation.

11. The plug of claim 1, comprising at least two depolarizers, wherein the at least two depolarizers differ in at least one of light intensity, wavelength, time delay of emission and decay time.

* * * * *